US007810102B2

(12) United States Patent
Brendle et al.

(10) Patent No.: US 7,810,102 B2
(45) Date of Patent: Oct. 5, 2010

(54) SERVICE ADAPTATION OF THE ENTERPRISE SERVICES FRAMEWORK

(75) Inventors: Rainer Brendle, Neckargemuend (DE); Frank Brunswig, Heidelberg (DE); Thomas Gauweiler, Speyer (DE); Peter Giese, Kaiserslautern (DE); Stephan Ritter, Saarbruecken (DE); Juergen Schmerder, Wiesloch (DE); Frank Seeger, Wiesloch (DE); Johannes Viegener, Karlsruhe (DE)

(73) Assignee: SAP AG, Walldorf (DE)

( * ) Notice: Subject to any disclaimer, the term of this patent is extended or adjusted under 35 U.S.C. 154(b) by 1135 days.

(21) Appl. No.: 11/319,406

(22) Filed: Dec. 29, 2005

(65) Prior Publication Data
US 2007/0157167 A1 Jul. 5, 2007

(51) Int. Cl.
G06F 9/44 (2006.01)
G06F 3/00 (2006.01)
G06F 9/46 (2006.01)
G06F 13/00 (2006.01)
(52) U.S. Cl. ............... 719/320; 719/328; 719/332; 717/102; 717/117; 717/121
(58) Field of Classification Search ............... 709/203; 713/201; 719/319
See application file for complete search history.

(56) References Cited

U.S. PATENT DOCUMENTS 6,065,043 A * 5/2000 Domenikos et al. ......... 709/203
6,269,373 B1 * 7/2001 Apte et al. ..................... 707/10
2002/0010867 A1 * 1/2002 Schaefer et al. ............. 713/201
2006/0069717 A1 * 3/2006 Mamou et al. .............. 709/203

FOREIGN PATENT DOCUMENTS

WO WO 97/44729 11/1997
WO WO 00/33187 A1 6/2000

OTHER PUBLICATIONS

Naser, A., "An Introduction to the Oracle Applications Framework Release 11.5.10", retrieved from the Internet: URL:http://www.oracle.com/technology/products/applications/development_personalization/OAF510TechnicalWhitepaper.doc [retrieved on Apr. 18, 2007].
Sutherland, J., "The Emergence of a Business Object Component Architecture", Proceedings of the 8th Workshop on Enabling Technologies on Infrastructure for Collaborative Enterprises; IEEE Computer Society; pp. 330-340 (Jun. 16, 1999).

* cited by examiner

*Primary Examiner*—Hyung S Sough
*Assistant Examiner*—Tuan Dao
(74) *Attorney, Agent, or Firm*—Mintz, Levin, Cohn, Ferris, Glovsky & Popeo, P.C.

(57) ABSTRACT

Systems, methods, and computer program products are provided for adapting service entities using a declarative approach in a service framework. In accordance with one implementation, a method is provided for adapting service entities. The method includes the steps of retrieving at least one software entity from a first repository in response to a first input and receiving a declaration from a user for adapting the software entity. The method further includes the steps of adapting the software entity to an adapted software entity based on the declaration and storing the adapted software entity in a second repository.

16 Claims, 5 Drawing Sheets

SERVICE ADAPTATION OF THE ENTERPRISE SERVICES FRAMEWORK

BACKGROUND

1. Field of the Invention

The present invention relates generally to service adaptation and, more particularly, to adapt service entities using a declarative approach in a service framework.

2. Description of the Related Art

Service entities (e.g., Web services, software applications, software components, software modules, software entities, and the like) provide flexible building blocks of enterprise business systems. As a standard means of interoperating between different software applications that run on a variety of platform and/or frameworks, service entities can be combined in a loosely coupled way in order to achieve complex operations. Typically, descriptions of service entities are centrally stored and are accessible through standards-based mechanisms (e.g., transmission control protocol/internet protocol (TCP/IP), hyper text transfer protocol (HTTP), file transfer protocol (FTP), simple object access protocol (SOAP), common object request broker architecture (CORBA), remote procedure call (RPC), and the like) to enterprise applications that would like to invoke the service entities.

However, service entities are often designed to expose functionality of individual applications and may be too limited to be efficient building blocks for enterprise-wide business processes. A solution has been the migration to a Service Oriented Architecture (SOA). The SOA is an open architecture middleware, which builds on the benefits provided by service entities. An example of an SOA is Enterprise Service Framework (ESF) of SAP AG of Walldorf, Germany (SAP).

In a service framework (e.g., ESF) that includes service entities, a client can call a service entity from a service entity provider through an Application Program Interface (API). As used herein, the term "service framework" refers to a defined support structure in which software systems and applications, such as Web services, can be developed, organized, compiled, deployed, customized, run, and/or executed. A service framework may include computer hardware, computer networks, user interfaces, support programs, code libraries, code repositories, scripting language, or other components to help develop and glue together the different components of one or more software systems or applications. The service entity provider allows the instantiation of business objects in response to the API call. As used herein, the term "instantiate" means, in an object oriented programming (OOP) environment, an object of a particular class, and, more generally, includes deploying, customizing, running and/or executing an application.

An "object" means a software bundle of variables (e.g., data) and related methods (e.g., business logic). For example, in object-oriented programming, an object is a concrete realization (i.e., "instance") of a class that consists of data and the operations associated with that data. Software "components" or "entities" (e.g., service entities and Web service entities) generally take the form of objects, in some binary or textual form, and adhere to one or more interface description languages (IDL), so that the components or entities may exist autonomously from other components or entities in a computer system. The phrase "business object" refers to a software bundle of variables and related methods that can be used to encapsulate business logic that describes a business process or task. For example, a client can call the API of a service entity provider through a communication mechanism, such as the Internet or intranet. The API, when called, instantiates business objects, such as a catalog service entity provider for listing products from a catalog or a purchasing service entity provider for allowing the purchase of a product.

Business logic encapsulated in a business object may be decoupled from business scenario-specific requirements. The business logic encapsulation may be governed by business-driven functionality requirements, leading to a normalized approach. Typically, the encapsulated business logic is designed independent of user-interface (UI) requirements. The business logic encapsulation is instead designed to provide a stable interface and maximum reusability. In contrast, a user interface requirement is typically governed by the user's perspective in a specific scenario. Thus, in different user interface scenarios, user interface requirements may require different parts of a business object or even parts from separate business objects. For example, a user interface specific scenario for displaying items in a sales order may rely on both a sales order business object for accessing the sales order and a product information business object for retrieving product information related to the items in the sales order.

A declarative approach may also be utilized for stable interfaces and maximum reuse of an algorithm. The declarative approach may separate the logic of the algorithm from the control of an algorithm. A user may specify, via a declaration, the logic or equations indicating the relations to be solved, but the computing system may be responsible for the control and/or evaluation of the logic or equation. Examples of the declarative approach are spreadsheets and query languages for relational databases. The user specifies a mathematical relation as a declaration (e.g., a query based on structured query language, or SQL) for retrieving data from a database, while a database system determines how to execute the query against the database.

In the view of the foregoing, there is a need for systems and methods that bridge the gap between scenario-specific requirements in an user interface view and business logic encapsulated in business objects during the user interface construction process. Further, there is a need for additional functionality to harmonize the fine-granular encapsulation (e.g., user interface view) with the coarse external service level (e.g., Web services, service entities, etc.). It is desirable that such systems and methods enable adaptation of service entities using a declarative approach in a service framework.

SUMMARY OF THE INVENTION

Consistent with embodiments of the invention, systems and methods are provided for adapting software entities using a declarative approach in a service framework. Embodiments of the invention include systems and methods, as well as computer program products comprising a computer-readable storage medium having computer-readable program code that perform methods consistent with the invention when implemented by a computer or processor.

In accordance with an embodiment, a method is provided for adapting software entities using a declarative approach in a service framework. The method includes the steps of retrieving at least one software entity from a first repository in response to a first input and receiving a declaration from a user for adapting the software entity. The method further includes the steps of adapting the software entity to an adapted software entity based on the declaration and storing the adapted software entity in a second repository.

Consistent with another embodiment of the present invention, a computer program product is provided for adapting software entities using a declarative approach in a service framework. The computer program product comprises a computer-readable storage medium having computer-readable program code stored therein. The computer-readable program code is executable by a processor and comprises an entity retrieval instruction set executable to retrieve at least one software entity from a first repository in response to a first input. The computer-readable program code also includes a declaration instruction set executable to receive a declaration from a user for adapting the software entity and an adapter instruction set executable to adapt the software entity to an adapted software entity based on the declaration. The computer-readable program code further includes a storage instruction set executable to store the adapted software entity in a second repository.

In still a further embodiment, a system is provided for adapting software entities using a declarative approach in a service framework. The system includes a memory and a processor, wherein the processor and the memory are configured to perform a method comprising the steps of retrieving at least one software entity from a first repository in response to a first input and receiving a declaration from a user for adapting the software entity. The method further includes the steps of adapting the software entity to an adapted software entity based on the declaration and storing the adapted software entity in a second repository.

It is to be understood that both the foregoing general description and the following detailed description are exemplary and explanatory only, and should not be considered restrictive of the scope of the invention, as claimed. Further, features and/or variations may be provided in addition to those set forth herein. For example, embodiments consistent with the present invention may be directed to various combinations and sub-combinations of the features described in the following detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1:
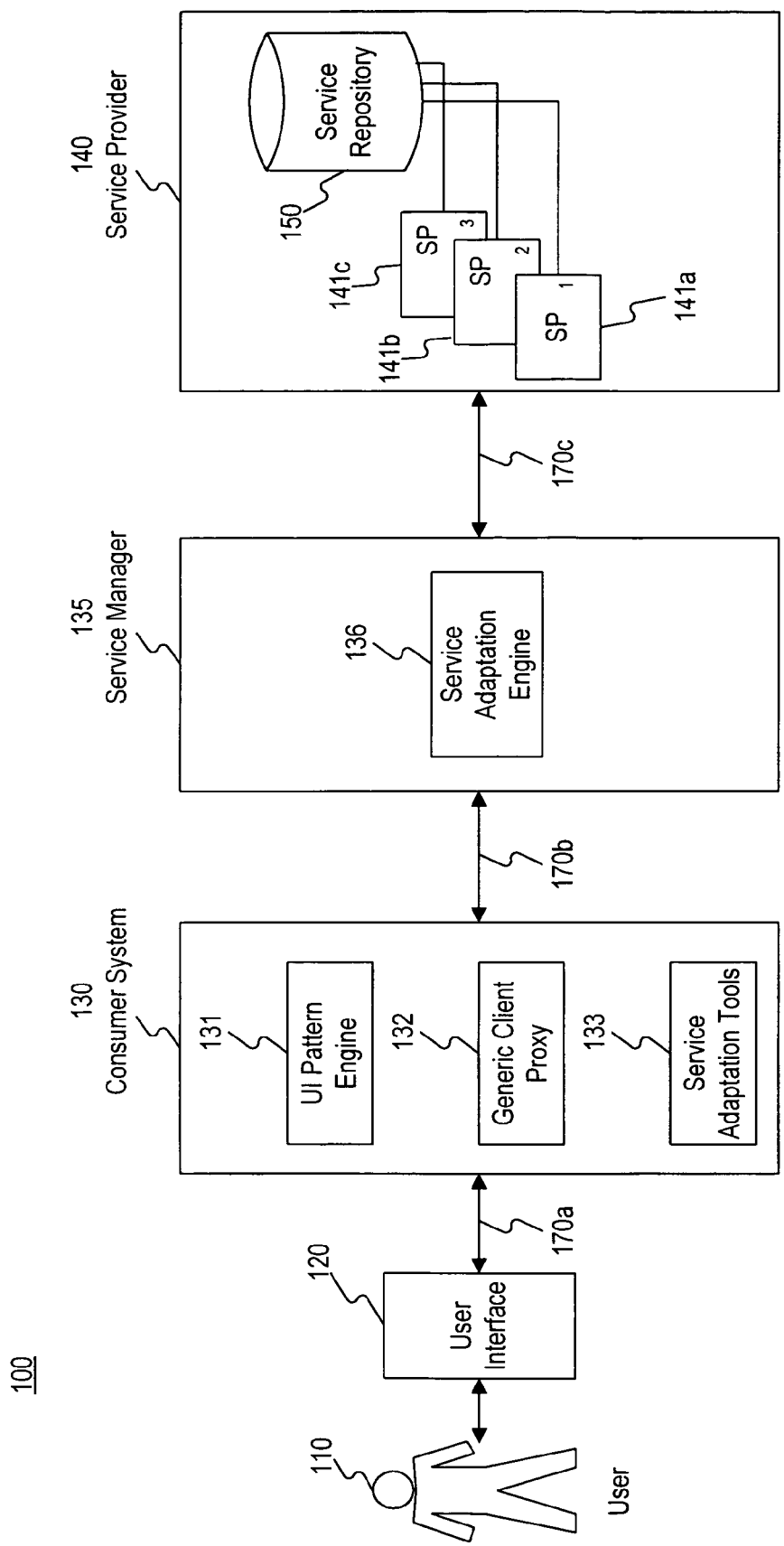
FIG. 1 is a block diagram of an exemplary system environment, consistent with the present invention, that includes a user interface pattern engine and service providers, and a service adaptation layer for enabling adaptation of service entities using a declarative approach in a service framework.

FIG. 1 illustrates a block diagram of a system 100 environment that includes a user interface pattern engine 131, service providers 141a-c, and a service adaptation engine 136 for enabling adaptation of service entities using a declarative approach in a service framework. System 100 also includes a user 110, a user interface (UI) 120, network connections 170a-170c, a consumer system 130, a service manager 135, and a service provider 140. Consumer system 130 may further include user interface pattern engine 131, a generic client proxy (GCP) 132, and adaptation tools 133. Service manager 135 may further include an adaptation engine 136, which has access to interfaces of service manager 135. Service provider 140 further includes service providers 141a-c and a service repository 150.

In one embodiment consistent with aspects of the present invention, system 100 may be implemented as part of an enterprise services framework (ESF). An ESF allows service entities (e.g., Web services, software applications, software components, software modules, etc.) to be aggregated to form composite business-level applications. Although FIG. 1 is described with respect to an enterprise service architecture, system 100 may utilize any other framework or software architectural environment. For example, consumer system 130 may be implemented as a client, and service provider 140 may be implemented as a server in a client-server architectural environment. Service manager 135 may be implemented at either the client or the server.

User 110 may be any entity. For example, user 110 may be a developer who develops a component of system 100 or a designer who designs a user interface. User interface 120 may provide content, such as visual displays, to user 110. Moreover, user interface 120 may include a browser configured on consumer system 130 for interacting with applications, such as service providers 141a-c. For example, the browser of user interface 120 may connect, at runtime, to user interface pattern engine 131, generic client proxy 132, and adaptation tools 133 through network connections 170a-c and service manager 135 to view and interact with content from service providers 141. User 110 may request an instance of a business object at one of service providers 141a-c, for example a purchase order form through user interface 120. User interface 120 may then send the configuration information of the purchase order form to consumer system 130 for configuring the purchase order form. For example, the configuration information configures the purchase form by defining the display (e.g., buttons, menus, text boxes, etc.), such that the content from a service provider is provided to the configured order form.

Network connections 170a-170c may include, alone or in any suitable combination, a telephony-based network, a local area network (LAN), a wide area network (WAN), a dedicated intranet, wireless LAN, the Internet, a wireless network, a bus, or any other communication mechanisms. Further, any suitable combination of wired and/or wireless components and systems may be used to provide network connections 170a-170c. Moreover, network connections 170a-170c may be embodied using bi-directional, unidirectional, or direct communication links. Further, network connections 170a-170c may implement protocols, such as transmission control protocol/internet protocol (TCP/IP), hyper text transfer protocol (HTTP), file transfer protocol (FTP), simple object access protocol (SOAP), common object request broker architecture (CORBA), remote procedure call (RPC), and the like.

User interface pattern engine 131 may receive configuration information of the requested user interface design, such as configuration information of a purchase order form, from user interface 120. User interface 120 may then send the configuration information of the purchase order form to consumer system 130 for configuring the purchase order form. At runtime, user interface pattern engine 131 may interpret the configuration information, and transform the configuration information into an Application Programming Interface (API) call to service adaptation engine 136 through generic client proxy 132 and service manager 135.

Generic client proxy 132 may include an API that is accessible to user interface 120. When generic client proxy 132 is instantiated, generic client proxy 132 may provide an interface, such as a RPC or a SOAP interface, to service manager 135 through network connection 170b. Generic client proxy 132 may be implemented to control the functionality available to user interface 120 by providing a well-defined interface to service manager 135. For example, service manager 135 may include a variety of functions, but user interface 120 may be allowed access only to a subset of those functions. Moreover, generic client proxy 132 may buffer requests and/or responses between user interface 120 and service manager 135.

Generic client proxy 132 may call service manager 135. Generic client proxy 132 may include a message handler for handling messages to and from service manager 135; a change handler for handling changes affecting service providers 141a-c (e.g., changes that occur when user 110 interacts with user interface 120, such as a button click, that affects a service provider or the corresponding business objects); a controller for controlling dynamic properties of the instance (e.g., making data associated with a business object read-only, changeable, mandatory, invisible, and the like); and a stack for storing changes associated with the change handler in a last in, first out manner.

Service adaptation tools 133 may have an API that is accessible to user interface 120. Consumer system 130, service manager 135, or both may instantiate service adaptation tools 133 to provide an interface (e.g., an RPC or a SOAP interface) to service manager 135 through network connection 170b. Service adaptation tools 133 may be implemented and made available to user interface 120 to enable user 110 to generate "adapted" service entities from existing service entities. An adapted service entity is a service entity created or extended from one or more existing service entities based on one or more declarations specified by user 110. The adapted service entities retain the interfaces of their corresponding existing service entities. In other words, the adapted service entities appear and behave like their corresponding existing service entities to user 110. User 110 may use adaptation tools 133 to adapt one or more existing service entities into one or more adapted service entities using a declarative approach, as discussed in greater detail below. Furthermore, adaptation tools 133 may buffer adaptation requests and/or responses between user interface 120 and service manager 135.

Service manager 135 may further analyze the incoming API call from generic client proxy 132, which contains the configuration information. For example, service manager 135 may instantiate one or more service providers, such as service provider 141a. When service provider 141a is instantiated, service provider 141a may instantiate a business object and the corresponding business object node. Service manager 135 may also instantiate an instance of service adaptation engine 136 and pass the configuration information received from generic client proxy 132 to service adaptation engine 136. Service adaptation engine 136 may create a business object node according to the configuration information received from generic client proxy 132. A business object node refers to a unit, or a component, of a business object. A business object node contain data and/or associations to other business object nodes. A business object may also support generic, mass operation-enabled read and write operations, navigation to other business object nodes via associations, queries, actions (e.g., print, create follow-on document), and access to dynamic meta data. For example, user 110 may access user interface 120 to request a purchase order form (the purchase form and its related methods encapsulated in a business object) from service providers 141a-c, along with a component of the purchase order form (e.g., a product description in the purchase order form) corresponding to a business object node. The structure of this business object node may reflect the configuration of the requested user interface design. For example, the business object node may be used by service provider 141 to fulfill the incoming API call from generic client proxy 132.

Service repository 150 stores and organizes services and the information that the services consume and produce. Service repository 150 stores and organizes information about the structure of a business object, for example, business object nodes contained in the business object and the queries, actions, and associations associated with the business object nodes. The information stored in service repository may also describe if those business object nodes allow reading and/or writing. At design time, a developer (or designer) may request and receive an index of services from consumer system 130, service manager 135, and/or service provider 140. The developer may select one or more existing services from the index and retrieve the existing services from service repository 150 to help design new services and define new inter-relationships between services. At runtime, service providers 141 may search for information sources in service repository 150.

Figure 2:
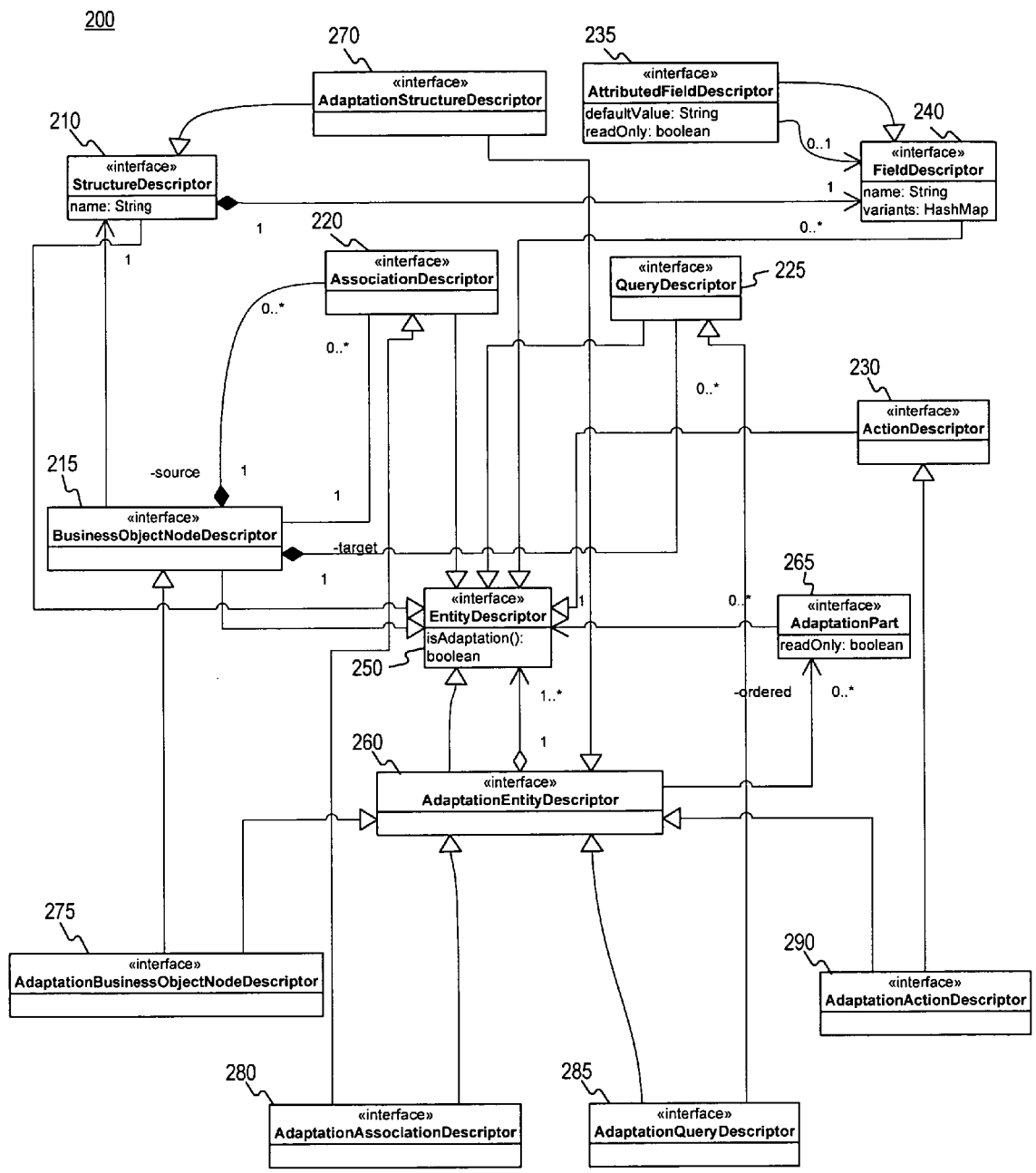
FIG. 2 is an exemplary adaptation meta model for storing, managing, indexing, interrelating, and/or retrieving a data model for service adaptation, consistent with the principles of the present invention.

FIG. 2 is an exemplary class diagram depicting an adaptation meta model for storing, managing, indexing, interrelating, and/or retrieving a data model for service adaptation, consistent with aspects of the present invention. An adaptation meta model 200 for service adaptation is a schema for storing all required meta data for adaptation tools 133, adaptation engine 136, and/or an application using adapted service entities. Adaptation meta model 200 may be based on a design pattern (e.g., the Gang of Four composite pattern) to allow storage of adaptation meta data entities in adaptation meta model 200 and to leave the existing meta data entities unchanged. In FIG. 2, the rectangular boxes represents classes or interfaces in meta model 200.

Adaptation meta model 200 extends without modifying existing meta model entities utilized by system 100. Adaptation meta model 200 contains an interface EntityDescriptor 250, which is inherited by other interfaces in the existing meta model, including interfaces StructureDescriptor 210, BusinessObjectNodeDescriptor 215, Association Descriptor 220, QueryDescriptor 225, Action Descriptor 230, AttributedFieldDescriptor 235, and FieldDescriptor 240. Adaptation meta model 200 extends existing meta model entities through adaptation interfaces, including Adaptation EntityDescriptor 260, AdaptationPart 265, AdaptationStructureDescriptor 270, AdaptationBusinessObjectNodeDescriptor 275, AdaptationAssociationDescriptor 280, AdaptationQueryDescriptor 285, and AdaptationActionDescriptor 290. Adaptation interfaces 270-290 inherit AdaptationEntityDescriptor 260, which inherits EntityDescriptor 250. Adaptation interfaces 270-290 also inherit their corresponding existing entity interfaces 210-230. For example, AdaptationStructureDescriptor 270 inherits StructureDescriptor 210, AdaptationBusinessObjectNodeDescriptor 275 inherits BusinessObjectNodeDescriptor 215, etc. Therefore, changes made to the existing meta model entities may be inherited by and propagated to the adaptation meta model 200.

AdaptationEntityDescriptor 260, which has an adaptation description, serves as a super interface for adaptation meta model 200. Components that comprise an adapted service implement AdaptationEntityDescriptor 260. Each component is an adaptation part that implements AdaptationPart 265, which references an existing entity through an entity descriptor that implements EntityDescriptor 250. The components may be different for each kind of adaptation. Each kind of adaptation has its own descriptor that describes the adaptation. The descriptors are instantiated from corresponding descriptor classes that implement from both AdaptationEntityDescriptor 260 and corresponding EntityDescriptor 250 (e.g., adaptation association descriptor that implements AdaptationAssociationDescriptor 280 also implements AssociationDescriptor 220).

An adaptation business object node descriptor that implements AdaptationBusinessObjectNodeDescriptor 275 contains references to a leading (or primary) business object node and an auxiliary (or secondary) business object node. An adaptation association descriptor implementing AdaptationAssociationDescriptor 280 includes a list of other associations. An adaptation query descriptor that implements AdaptationQueryDescriptor 285 contains a query and any number of associations. An adaptation action descriptor implementing AdaptationActionDescriptor 290 contains references to other actions. An adaptation structure descriptor implementing AdaptationStructureDescriptor 270 contains links to attributed field descriptors that implement an interface AttributedFieldDescriptor 235, which refer to a field of an underlying structure, but may assign a different name to it. AttributedFieldDescriptor 235 supplements FieldDescriptor 240 by indicating if a field is read-only in a particular adaptation and providing a default value for the field in the adaptation. Attributed field descriptors distinguish between fields of an existing entity and an adaptation entity that have same names if the existing entity and the adaptation entity have the same structures. Because the attributed field descriptors contain information specific for an adaptation, the attributed field descriptors may not be reused for another adaptation.

Figure 3:
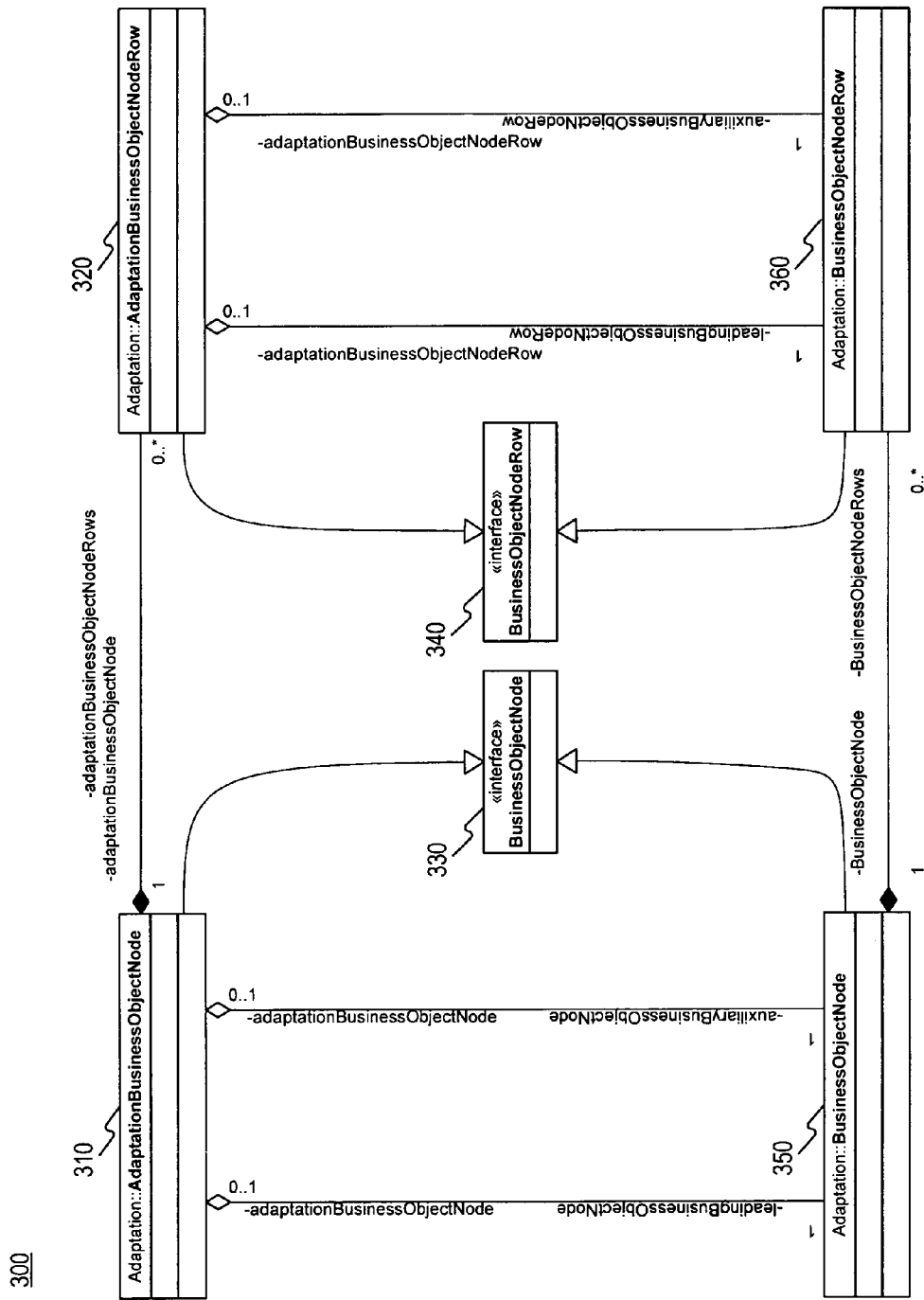
FIG. 3 shows an exemplary class diagram for new generic client proxy classes, consistent with the principles of the present invention.

FIG. 3 is an exemplary class diagram for new generic client proxy (GCP) classes. Class diagram 300 for service adaptation stores all required information for adaptation tool 133, adaptation engine 136, and/or any application using adapted service entities. In FIG. 3, the rectangular boxes represents classes in class diagram 300. An adaptation business object node may be instantiated from a class AdaptationBusinessObjectNode 310. The meta data of the adaptation business object node is described by the adaptation business object node descriptor. The adaptation business object node is a collection of adaptation business object node rows of a class AdaptationBusinessObjectNodeRow 320. Data about the adaptation business object node is not stored directly in the adaptation business object node rows. Instead, the adaptation business object node rows contain references to the leading (or primary) business object node row of a class BusinessObjectNodeRow 360 and to an auxiliary (or secondary) business object node row of class BusinessObjectNodeRow 360. Therefore, changes made to the business object node rows may be propagated to the corresponding adaptation object node rows. Likewise, the adaptation business object node contain references to the leading (or primary) business object node of a class BusinessObjectNode 350 and to an auxiliary (or secondary) business object node of class BusinessObjectNode 350, and changes made to the business object node or nodes may be propagated to the corresponding adaptation object node or nodes. Access to the collection of adaptation business object node rows through an interface BusinessObjectNodeRow 340 is delegated to the corresponding underlying class BusinessObjectNodeRow 360. Similarly, access to the adaptation business object node through an interface BusinessObjectNode 330 is delegated to the corresponding underlying class BusinessObjectNode 350.

Figure 4:
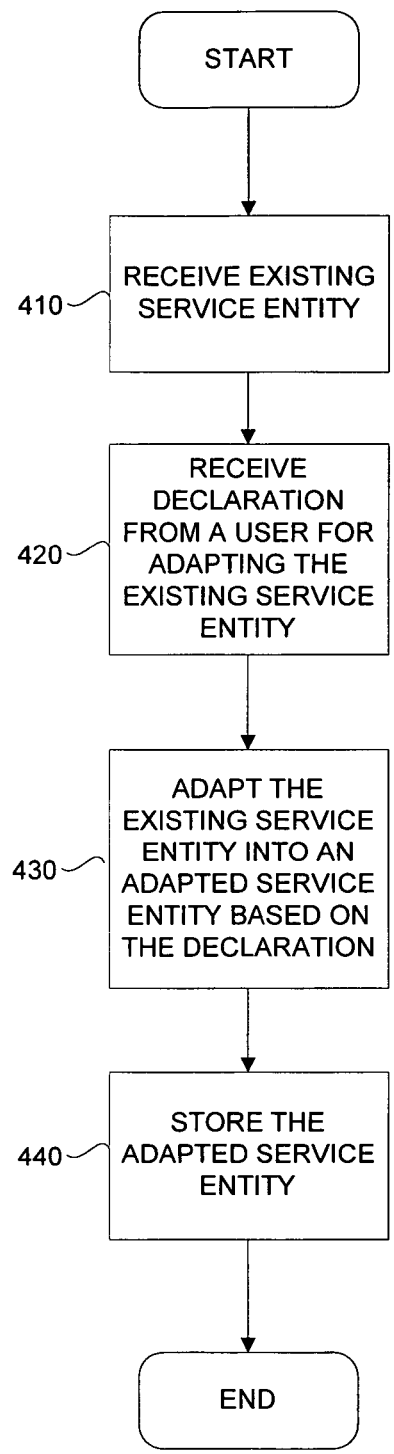
FIG. 4 illustrates a flowchart of an exemplary embodiment, consistent with the present invention, of a method for adapting software entities using a declarative approach in a service framework.

FIG. 4 illustrates exemplary steps for adapting software entities using a declarative approach in a service framework. Consumer system 130 or service manager 135 may retrieve an index of existing services in service repository 150 and present the index to user 110 via user interface 120. User 110 may request one or more existing service or entities via user interface 120, which forwards the request to consumer system 130. Next, consumer system 130 may forward the request to service manager 135, which then requests the existing service entity from service provider 140. Alternatively, consumer system 130 may directly request the existing service entity from service provider 140. At step 410, consumer system 130 receives the existing service entity from service provider 140, either directly or through service manager 135.

Next, in step 420, a component (e.g., service adaptation tools 133) in consumer system 130 receives a declaration from user 110 for adapting the existing service entity in accordance to one or more adaptation operations. The adaptation operations are further described below. Service adaptation tools 133 may verify or otherwise process the declaration to ensure that the declaration is valid and syntactically correct. Then, in step 430, service adaptation tools 133 may directly adapt the existing service entity based on the declaration. Alternatively, consumer system 130 or service manager 135 may load the adaptation operations and present the adaptation operations to user 110 via user interface 120. Service adaptation tools 133 may adapt the existing service entity based on the declaration and one or more of the adaptation operations specified by user 110. Alternatively, service adaptation tools 133 may forward the declaration to service manager 135 for service adaptation engine 136 to adapt the existing service entity based on the declaration in accordance to the adaptation operations specified by user 110.

In step 440, subsequent to a successful adaptation of the existing service entity into an adapted service entity, the adapted service entity is stored in service repository 150.

Adaptation Operations

Consistent with embodiments of the invention, service adaptation tools 133, service adaptation engine 136, or both may perform the following adaptation operations: (1) join additional attributes read-only, (2) join of :1-related business object nodes of the same object, (3) sequence of associations, (4) action sequences, (5) discarding fields from business object node, (6) additional fixed or computed values, (7) join of 0 . . . 1-related business object nodes, (8) usage of queries in association sequences, (9) filtering associations, (10) composite queries with sequences of operations, and (11) set operations on queries.

The "join additional attributes read-only" adaptation operation may create an adaptation business object node that combines data from a main business object node with additional read-only data from one or more target business object nodes, intended for the benefit of user 110. This adaptation operation may, for example, join customer master data in a business object node with customer address data in another business object node by a customer identification number.

The "join of :1-related business object nodes of the same object" adaptation operation may join a business object's nodes that have been previously separated. Due to performance considerations (e.g., computationally expensive data fields, such as a sum of a data field), logical grouping of fields (e.g., fields of the same data that are not directly related), and/or special data fields with limited usage, different fields of the same business object may be separated into different business object nodes. For a specific user-interface (UI) scenario, these fields that have been separated may need to be rejoined for presentation on the same screen.

The "sequence of associations" adaptation operation may hide or eliminate unnecessary intermediate business object nodes. When a business object is deeply structured, not all elements (i.e., business object nodes) of a business object are relevant for a specific UI scenario. In this scenario, a sequence of associations (e.g., from a business object node A to a business object node B, then to a business object node C) may be reduced to a single composite association (e.g., from business object node A directly to business object node C). The composite association may contain an arbitrary number of intermediate steps. In the meta data, the associations and sequences between business object nodes should be specified. The cardinality of a target association may be calculated from the given cardinalities of the associations between the business object nodes. For example, assume that a first association has a cardinality of :1, such as a vehicle and the vehicle's exterior color (e.g., red). Further assume that a second association has a cardinality of :1 . . . n, such as a vehicle's exterior color (e.g., red) and one or more possible interior colors for a vehicle with that exterior color. The resulting composite association of the first and second associations then has a cardinality of :1 . . . n (e.g., a vehicle may have one or more possible interior colors regardless of the vehicle's exterior colors). Table 1 depicts rules for each of the associations in the adapted sequence, wherein association Assoc(AB) is an association with source business object node A and target business object node B, and association Assoc(BC) is an association with source business object node B and target business object node C.

TABLE 1

| | Rules | | | |
|---|---|---|---|---|
| | | Assoc(BC) | | |
| Assoc(AB) | :0..1 | :1 | :0..n | :1..n |
| :0..1 | :0..1 | :0..1 | :0..n | :0..n |
| :1 | :0..1 | :1 | :0..n | :1..n |
| :0..n | :0..n | :0..n | :0..n | :0..n |
| :1..n | :0..n | :1..n | :0..n | :1..n |

The "action sequences" adaptation operation may combine actions of one or more business object nodes into a combined action. For example, a business object node may offer distinct actions for recalculating the price of a sales order based on actual conditions and modifying the shipment type for a sales order. This adaptation operation combines the modification of shipment type with a recalculation of the price to reflect any changes to the price of the sales order caused by the modification of shipment type.

The "discarding fields from business object node" adaptation operation may create an adapted business object node by discard unnecessary or omitted fields.

The "additional fixed or computed values" adaptation operation may create an adapted business object node by inserting newly computed or fixed fields in an adapted business object node.

The "join of 0 . . . 1-related business object nodes" adaptation operation is similar to the above-described adaptation operation of "joining :1-related business object node of the same object." However, the "join of 0 . . . 1-related business object nodes" adaptation operation creates an adaptation business object node that combines data from a main business object node with additional read-only data from one or more target business object nodes, even if one or more of the target business object nodes contain zero rows.

The "usage of queries in association sequences" adaptation operation may combine queries of one or more business object nodes into a combined sequence of associations.

The "filtering associations" adaptation operation may filter an association between business object nodes based on one or more criteria. For example, this adaptation operation may filter out from an association any business object node rows that are not in English.

The "composite queries with sequences of operations" adaptation operation may combine an existing query with multiple operations to be executed in sequence. For example, an existing query for sales orders (e.g., finding sales orders by date) may be used to find customers based on the result of the query and the association of a sales order business object to a customers business object. This adaptation operation creates an adapted query that finds customers based on the date of assigned sales orders.

The "set operations on queries" adaptation operation may adapt an existing query (or queries) into an adapted query using set operations, e.g., union, intersection, and the like.

Figure 5:
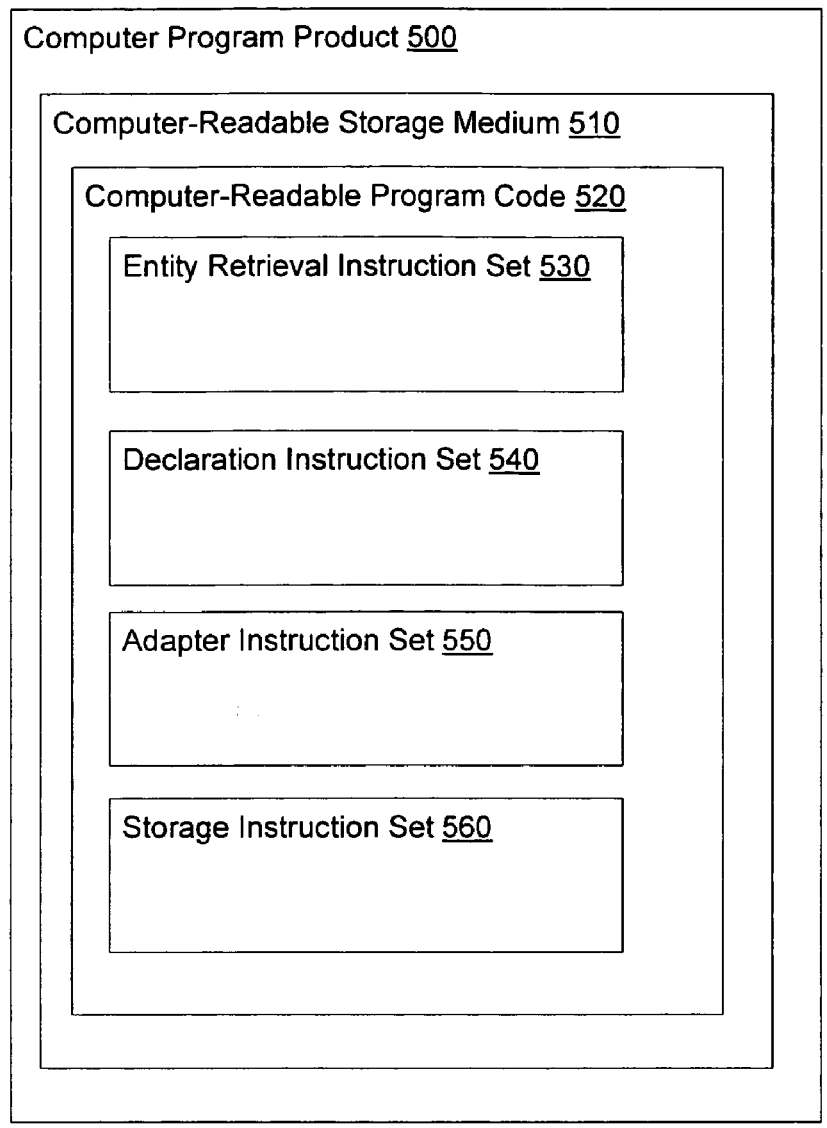
FIG. 5 is a block diagram of an exemplary embodiment, consistent with the present invention, of a computer program product including a computer-readable storage medium having computer-readable program code stored therein.

For purposes of illustration, FIG. 5 is a block diagram of one exemplary embodiment, consistent with the present invention, of a computer program product 500 including a computer-readable storage medium 510 that has computer-readable program code 520 stored therein. Computer-readable program code 520 includes an entity retrieval instruction set 530 executable to retrieve at least one service from service repository 150 in response to a request from user 110. Computer-readable program code 520 further includes a declaration instruction set 540 executable to receive a declaration for adapting the service and an adapter instruction set 550 executable to transform the service to an adapted service based on the declaration. Computer-readable program code 520 also includes an storage instruction set 560 executable to store the adapted service in a service repository (e.g., service repository 150).

The foregoing descriptions of the invention have been presented for purposes of illustration and description. They are not exhaustive and do not limit the invention to the precise form disclosed. Modifications and variations are possible in light of the above teachings or may be acquired from practicing of the invention. For example, the described implementation includes software, but the present invention may be implemented as a combination of hardware and software or in hardware alone. Further, while certain exemplary methods have been described, it will be appreciated that the order of the method may be rearranged and stages or steps may be substituted, modified, combined or otherwise altered.

The systems and methods disclosed herein may be embodied in various forms including, for example, a data processor, such as a computer that also includes a database, digital electronic circuitry, firmware, software, or combinations thereof. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

The systems and methods disclosed herein may be implemented as a computer program product, such as a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Other embodiments of the invention will be apparent to those skilled in the art from consideration of the specification and practice of the invention disclosed herein. Therefore, the specification and examples should be considered as exemplary only, with a true scope of the invention being indicated by the following claims.

What is claimed is:

1. A computer program product for adapting software entities using a declarative approach in a service framework, the computer program product comprising a computer-readable storage medium having computer-readable program code stored therein, the computer-readable program code being executable by a processor to cause the processor to perform operations comprising:

presenting, to a user via a user interface provided by a service consumer computer system, an index listing a plurality of software services available at the service provider system, the service provider computer system comprising a service repository storing a plurality of existing software entities that each provide one of the plurality of software services;

retrieving, by the service consumer computer system from the service repository, an existing software entity of the plurality of existing software entities in response to selection of a corresponding one of the software services from the index by the user, the existing software entity comprising a software entity interface and business logic;

receiving, at the service consumer computer system from the user via the user interface, a declaration specifying logic or equations indicating relations to be solved for adaptation of the existing software entity by the service consumer computer system to an adapted software entity having compatibility with a scenario-specific user interface view provided by the service consumer computer system;

adapting the existing software entity to the adapted software entity in accordance with the declaration, the adapting of the existing software entity to the adapted software entity comprising the service consumer computer system performing one or more of controlling and evaluating the logic or equation specified by the declaration, the adapted software entity retaining the existing software entity interface so that the adapted software entity appears to the user via the user interface and behaves like the existing software entity; and storing the adapted software entity at the service consumer computer system such that compatibility of the existing software entity with the scenario-specific user interface view at the service consumer computer system is provided to subsequent users.

2. The computer program product of claim 1, wherein the adapting of the existing software entity further comprises:
 loading one or more pre-defined adaptation operations;
 selecting an adaptation operation, in response to a second input from the user, from the pre-defined adaptation operations; and
 adapting, based on the declaration and the selected adaptation operation, the existing software entity to the adapted software entity.

3. The computer program product of claim 2, wherein the adapting of the existing software entity comprises adapting the existing software entity to the adapted software entity without modifying the existing software entity.

4. The computer program product of claim 3, wherein one or more modifications made to the existing software entity are propagated to the adapted software entity.

5. The computer program product of claim 2, wherein the operations further comprise: instantiating an object based on the adapted software entity.

6. A method comprising:

presenting, to a user via a user interface provided by a service consumer computer system, an index listing a plurality of software services available at the service provider system, the service provider computer system comprising a service repository storing a plurality of existing software entities that each provide one of the plurality of software services;

retrieving, by the service consumer computer system from the service repository, an existing software entity of the plurality of existing software entities in response to selection of a corresponding one of the software services from the index by the user, the existing software entity comprising a software entity interface and business logic;

receiving, at the service consumer computer system from the user via the user interface, a declaration specifying logic or equations indicating relations to be solved for adaptation of the existing software entity by the service consumer computer system to an adapted software entity having compatibility with a scenario-specific user interface view provided by the service consumer computer system;

adapting the existing software entity to the adapted software entity in accordance with the declaration, the adapting comprising the service consumer computer system performing one or more of controlling and evaluating the logic or equation specified by the declaration, the adapted software entity retaining the existing software entity interface so that the adapted software entity appears to the user via the user interface and behaves like the existing software entity; and storing the adapted software entity at the service consumer computer system such compatibility of the existing software entity with the scenario-specific user interface view at the service consumer computer system is provided to subsequent users.

7. The method of claim 6, wherein adapting the existing software entity further comprises:

loading one or more pre-defined adaptation operations;

selecting an adaptation operation, in response to a second input from the user, from the pre-defined adaptation operations; and adapting, based on the declaration and the selected adaptation operation, the existing software entity to the adapted software entity.

8. The method of claim 7, wherein adapting the existing software entity further comprises: adapting the existing software entity to the adapted software entity without modifying the existing software entity.

9. The method of claim 8, further comprising propagating one or more modifications made to the existing software entity to the adapted software entity.

10. The method of claim 7, wherein receiving the declaration further comprises: verifying validity and syntactical correctness of the declaration.

11. The method of claim 7, further comprising: instantiating an object based on the adapted software entity.

12. The method of claim 6, wherein the adapting further comprises creating an adaptation meta model that stores, at the service consumer computer system, adaptation meta data entities corresponding to the adapted software entity while leaving unchanged existing meta data entities corresponding to the existing software entity, wherein the existing software entity and the adapted software entity have a same structure and the adaptation meta data model further comprises attributed field descriptors that distinguish between similarly named fields of the existing software entity and the adapted software entity.

13. A system for adapting software entities using a declarative approach in a service framework, comprising:

a memory; and a processor, wherein the processor and the memory are configured to perform operations comprising:

presenting, to a user via a user interface provided by a service consumer computer system, an index listing a plurality of software services available at the service provider system, the service provider computer system comprising a service repository storing a plurality of existing software entities that each provide one of the plurality of software services;

retrieving, by the service consumer computer system from the service repository, an existing software entity of the plurality of existing software entities in response to selection of a corresponding one of the software services from the index by the user, the existing software entity comprising a software entity interface and business logic;

receiving, at the service consumer computer system from the user via the user interface, a declaration specifying logic or equations indicating relations to be solved for adaptation of the existing software entity by the service consumer computer system to an adapted software entity having compatibility with a scenario-specific user interface view provided by the service consumer computer system;

adapting the existing software entity to the adapted software entity in accordance with the declaration, the adapting comprising the service consumer computer system performing one or more of controlling and evaluating the logic or equation specified by the declaration, the adapted software entity retaining the existing software entity interface so that the adapted software entity appears to the user via the user interface and behaves like the existing software entity; and storing the adapted software entity at the service consumer computer system such that compatibility of the existing software entity with the scenario-specific user interface view at the service consumer computer system is provided to subsequent users.

14. The system of claim 13, wherein adapting the existing software entity further comprises:

loading one or more pre-defined adaptation operations;

selecting an adaptation operation, in response to a second input from the user, from the pre-defined adaptation operations; and adapting, based on the declaration and the selected adaptation operation, the existing software entity to the adapted software entity.

15. The system of claim 14, wherein adapting the software entity further comprises: adapting the software entity to the adapted software entity without modifying the software entity.

16. The system of claim 15, wherein one or more modifications made to the existing software entity are propagated to the adapted software entity.

* * * * *